US006278684B1

(12) United States Patent
Chiang et al.

(10) Patent No.: US 6,278,684 B1
(45) Date of Patent: Aug. 21, 2001

(54) OPTICAL INFORMATION RECORDING MEDIUM

(75) Inventors: Donyau Chiang, Hsinchu Hsien; Tzuan-Ren Jeng, Tou-Liu; Der-Ray Huang; Tsung-Shune Chin, both of Hsinchu; Yi-Yuan Huang, Chang-Hua; Chyan-Ming Lee, Kao-Hsiung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/333,530

(22) Filed: Jun. 15, 1999

(30) Foreign Application Priority Data

Apr. 13, 1999 (TW) .................................................. 88105836

(51) Int. Cl.$^7$ ............................... G11B 3/70; G11B 5/84; G11B 7/26
(52) U.S. Cl. ............................................................ 369/288
(58) Field of Search ..................................... 369/233, 288, 369/272

(56) References Cited

U.S. PATENT DOCUMENTS

| 5,294,523 | * | 3/1994 | Nagata et al. ................... 430/270.13 |
| 5,479,382 | * | 12/1995 | Nishida et al. ........................ 369/13 |
| 5,958,649 | * | 9/1999 | Hirotsune et al. .............. 430/270.13 |
| 6,033,752 | * | 3/2000 | Suzuki et al. ........................ 428/64.1 |
| 6,132,932 | * | 10/2000 | Miyamoto et al. ............. 430/270.13 |

OTHER PUBLICATIONS

Gonzalez–Hernandez et al, "Crystallization Studies of Ge:Sb:Te Optical Memory Materials" (Dec. 1992, Appl. Phys. Comm., v. 11 No. 4, p. 557–581).*
Abrikosov, "Investigation into the diagram of the composition of Sb2Te3–Ge Te" (1965, Izv. Akad. Nauk SSR Mater., v. 1 No. 2 p. 204).*
Yamada et al, "Solid–phase transitions of GeTe–Sb2Te3 pseudobinary amorphous thin films for an optical disk memory" (Mar. 1, 1991, J. Appl. Phys., v. 69 No. 5 p. 2849–2856).*

* cited by examiner

Primary Examiner—Craig A. Renner
Assistant Examiner—Julie Anne Watko
(74) Attorney, Agent, or Firm—W. Wayne Liauh

(57) ABSTRACT

This invention relates to a rewritable optical information recording medium of the phase-change type, which is made of a Te—Ge—Sb—B quaternary alloy. The optical contrast of the recording medium according to the present invention is enhanced over 35% in the visible wavelength range of 350 nm to 800 nm. Hence, the CNR of an optical disk with the recording medium of the present invention is increased, and the recording medium is suitable for optical information record operated in shorter visible wavelength. In addition, since the crystallization of the recording medium according to the present invention is single-phase, the performance of the repeated recording and erasing is enhanced.

14 Claims, 4 Drawing Sheets

OPTICAL INFORMATION RECORDING MEDIUM

FIELD OF THE INVENTION

The present invention relates to an optical information recording medium for use in an information recording/reproducing apparatus, particularly to a rewritable optical disk of the phase-change type.

BACKGROUND OF THE INVENTION

Rewritable optical disks can be roughly classified into the magneto-optic type disks and the phase-change type disks. In the phase-change disk, a recording film is reversibly converted between amorphous state and crystalline state by changing irradiation conditions of the laser beams so as to record signals, erase recorded signals and perform reproduction by optically detecting the difference in reflectance between an amorphous state and crystalline state of the recording film. In the GeTeSb phase change system the amorphous state of the recording film is defined as the recording state and the an crystalline state of the recording film is defined as the erasing state. Thus, in the recording stage of the phase-change type disk, one laser beam with a short and high-power pulse is focused onto the phase-change type disk for melting, and the melted area of the film transfers to an amorphous state by rapid cooling. When performing the recorded signals erase, another laser beam with a longer and middle-power pulse is focused to the phase-change film for annealing. The focused area of the phase-change type disk is heated and then switched either from an amorphous state to a crystalline state or from a crystalline state to a crystalline state. The recorded information on the film is consequently erased. Since the reflectance of the phase-change type disk in the crystalline state and the amorphous state is different, a beam with a constant low power is used to detect the intensity difference of the reflected beam. Information recorded on the disc is reproduced.

Since the phase change type disk player detects the reflectance difference between the amorphous and a crystalline state to distinguish the digital signals, it is required to have a higher reflectance contrast and provide a better read signal.

Referring to FIG. 1, a phase-change disk in general includes a protective layer 6, a reflecting layer 5, a second dielectric layer 4, a recording layer 3 and a first dielectric layer 2 which are stacked sequentially on a substrate 1. The first dielectric layer 2 and the second dielectric layer 4 may be made of one of the compounds, or their combination, of at least $SiO_2$, $ZnS$, $TaO_2$, $GeO$, $AlN$ and $Si_3N_4$. The substrate 1 may be made of polymethyl methacrylate (PMMA), polycarbonate (PC) or transparent glass, etc. The reflecting layer 5 may be made of one of the metals, or their alloy, of at least Al, Ag, Au, Ni, Cr, Pt and Pd. The protective layer 6 is made of resin or UV curable plastic material. The recording layer 3 is made of phase-change type material that has the characteristic to switch between crystalline and amorphous states. Most of the phase change type materials are chalcogenide alloy which contains elements, such as O, S, Se, Te and Po. Two phase-change type materials $Te_{85}Ge_{15}$ and $Te_{81}Ge_{15}S_2Sb_2$ were first disclosed in U.S. Pat. No. 3,530,441 by S. R. Ovshinsky. Other phase-change materials such as GeTe, InSe, InSeTe, InSeTeCo, GeTeSb, GeTeSn etc. were subsequently developed. A chemical composition close to $Ge_2Sb_{2.2}Te_5$ alloy discovered by the Matsushita Electrical Industries Company was first used as a rewritable medium.

The pseudo-binary alloy $GeTe$—$Sb_2Te_3$ was first disclosed in Izv. Akad. Nauk SSSR Mater. 1(2) pp. 204 (1965) by N. Kh. Abrikosov. In the ternary system of Ge—Sb—Te, three ternary compounds $GeSb_4Te_7$, $GeSb_2Te_4$ and $Ge_2Sb_2Te_5$ are founded to stand in a row on the pseudo-binary tie-line connecting GeTe and $Sb_2Te_3$. Disclosed in J. Appl. Phys. 69(5) pp. 2849 (1991) by Yamada etc., a phase-change film can have a relatively short crystallization time. It is found that a pseudo-binary alloy on the GeTe—$Sb_2Te_3$ tie-line can be crystallized within 100 nanosecond, and a shorter crystallizing period is performed with increasing the $Sb_2Te_3$ content along the pseudo-binary tie-line. In addition, the critical temperature of crystalline monotonically increases with increasing GeTe content along the pseudo-binary line. In the phase diagram of the pseudo-binary alloy GeTe—$Sb_2Te_3$, it tends to crystallize to a metastable FCC (Face-Centered Cubic) structure and then to a stable hexagonal structure.

In U.S. Pat. No. 5,278,011, the pseudo-binary alloys with some Se on the tie-lines GeTe—$Sb_2Te_3$ and GeTe—$Bi_2Te_3$ have higher sensitivity and quicker crystallizing rate. In U.S. Pat. No. 5,294,523, B or C of about 0 to 40 at. % is added to the alloy with Ge of 10 to 35 at. %, Sb of over 10 at. % and Te of 45 to 65 at. % to enhance the performance against repeated recording and erasing.

In Appl. Phys. Comm. 11(4) pp. 557 (1992) by Gonzalez-Hemandez etc., a new composition of $Ge_4SbTe_5$ located along the GeTe—$Sb_2Te_3$ tie-line was claimed and recognized as a single phase with FCC structure. However, J. H. Coombs found that the composition of the single phase alloy is $Ge_{39}Sb_9Te_{52}$.

The change in reflectivity between the amorphous and the crystalline states of the recording film through the visible-wavelength range is of great important for phase change recording. Optical contrast denoted the ratio of the reflectance difference between the crystalline and the amorphous state to the reflectance of the crystalline state is a numerical index. The higher the optical contrast the larger the CNR is (Carrier to Noise Ratio) during reading. In the prior art, the optical contrast is of about 20 to 35%, and the CNR is of about 45 to 48 dB. Since the optical contrast of the prior art phase-change type recording media is low, the optical-disk players of the prior art must provide a better reading quality to compensate for the lower optical contrast. Consequently, the cost of the player of the prior art is increased.

SUMMARY OF THE INVENTION

The major objective of the present invention is to provide an optical information recording medium having a higher optical contrast to increase the CNR of rewritable optical discs.

Another objective of the present invention is to provide an optical information recording medium having high a optical contrast in a shorter visible wavelength range to further increase the recording density of rewritable optical discs.

In order to achieve these objectives of the present invention, an optical information recording medium includes successively a substrate, a first dielectric layer formed on the substrate, a recording layer made of a Te—Ge—Sb—B quaternary alloy and formed on the first dielectric layer, a reflective layer formed on the recording layer and a protective layer formed on the reflective layer.

Since the quaternary alloy of Te—Ge—Sb—B has a higher optical contrast (over 35%) throughout the whole visible wavelength range, the CNR and recording density can be increased. In addition, the quaternary alloy of the present invention is a single-phase crystalline structure, hence it also exhibits an excellent performance against repeated recording and erasing.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE PREFERRED EMBODIMENTS

The recording layer of the present invention is made of a Te—Ge—Sb—B quaternary alloy as a major component, which has composition defined by a formula $Te_aGe_bSb_cB_d$ wherein a, b, c and d are atomic percentages ranging from 45 to 57, 35 to 45, 5 to 15 and 0.1, to 2 respectively. The recording layer may further contain other transition elements such as Ag, Cu, Ni or Fe to improve the other properties of the recording layer.

The recording layer of the present invention can be formed by a suitable method or methods such as thermal evaporation, electron-beam evaporation, sputtering, ion-plating and PVD methods. The Te—Ge—Sb—B quaternary alloy is composed of a Te—Ge—Sb ternary alloy $Te_5Ge_4Sb$ and doped B where the structure of the ternary alloy $Te_5Ge_4Sb$ is FCC. The fabrication process of the Te—Ge—Sb—B quaternary alloy according to the present invention includes:

A. Fabricating the Te—Ge—Sb—B quaternary alloy target by melting: Melt a mixture of Te, Ge, Sb and B with specific percentages in a rotating and shaking quartz ampoule at 800 to 1000° C. for about 3 hours, and then cool the quartz ampoule to make the Te—Ge—Sb—B quaternary alloy target.

B. Coat a thin film of the Te—Ge—Sb—B quaternary alloy with a thickness of 100 nm on a silicon wafer by a suitable method such as thermal evaporating, sputtering, ion-plating methods, etc. It is noted that the as-coated thin film is an amorphous phase.

C. Anneal the thin film of the Te—Ge—Sb—B quaternary alloy in a quartz ampoule at 300° C. for 10 minutes under the argon gas flow to crystallize the thin film.

According to the above fabrication process, four group samples with different compositions are made to measure their material characteristics. As listed in Table 1 below, the four group samples have the compositions of $Te_{51.2}Ge_{39.5}Sb_{9.3}$, $Te_{50.4}Ge_{40.0}Sb_{9.3}B_{0.3}$, $Te_{50.6}Ge_{39.4}Sb_{9.3}B_{0.7}$, $Te_{50.2}Ge_{39.2}Sb_{9.5}B_{1.1}$ respectively, where the film compositions of the four group samples are analyzed by ICP-AES (Inductively-Coupled-Plasma Atomic-Emission-Spectrometry). The first group samples are used for comparison, and the other group samples are the embodiments according to the present invention.

TABLE 1

(Film composition)

| | Composition |
|---|---|
| Prior art | $Te_{51.2}Ge_{39.5}Sb_{9.3}$ |
| Present invention | $Te_{50.4}Ge_{40.0}Sb_{9.3}B_{0.3}$ |
| Present invention | $Te_{50.6}Ge_{39.4}Sb_{9.3}B_{0.7}$ |
| Present invention | $Te_{50.2}Ge_{39.2}Sb_{9.5}B_{1.1}$ |

Figure 1:
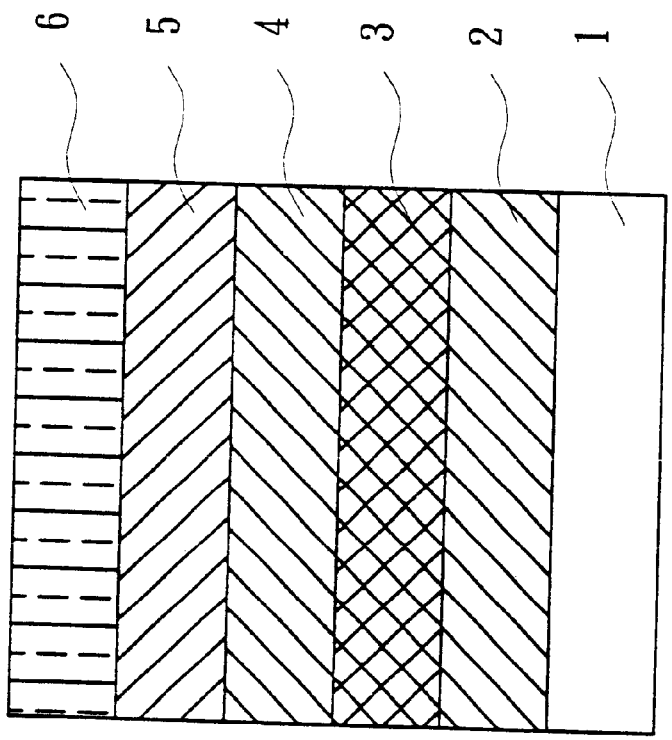
FIG. 1 shows the cross section structure of an optical information recording medium of phase change type.
Figure 2:
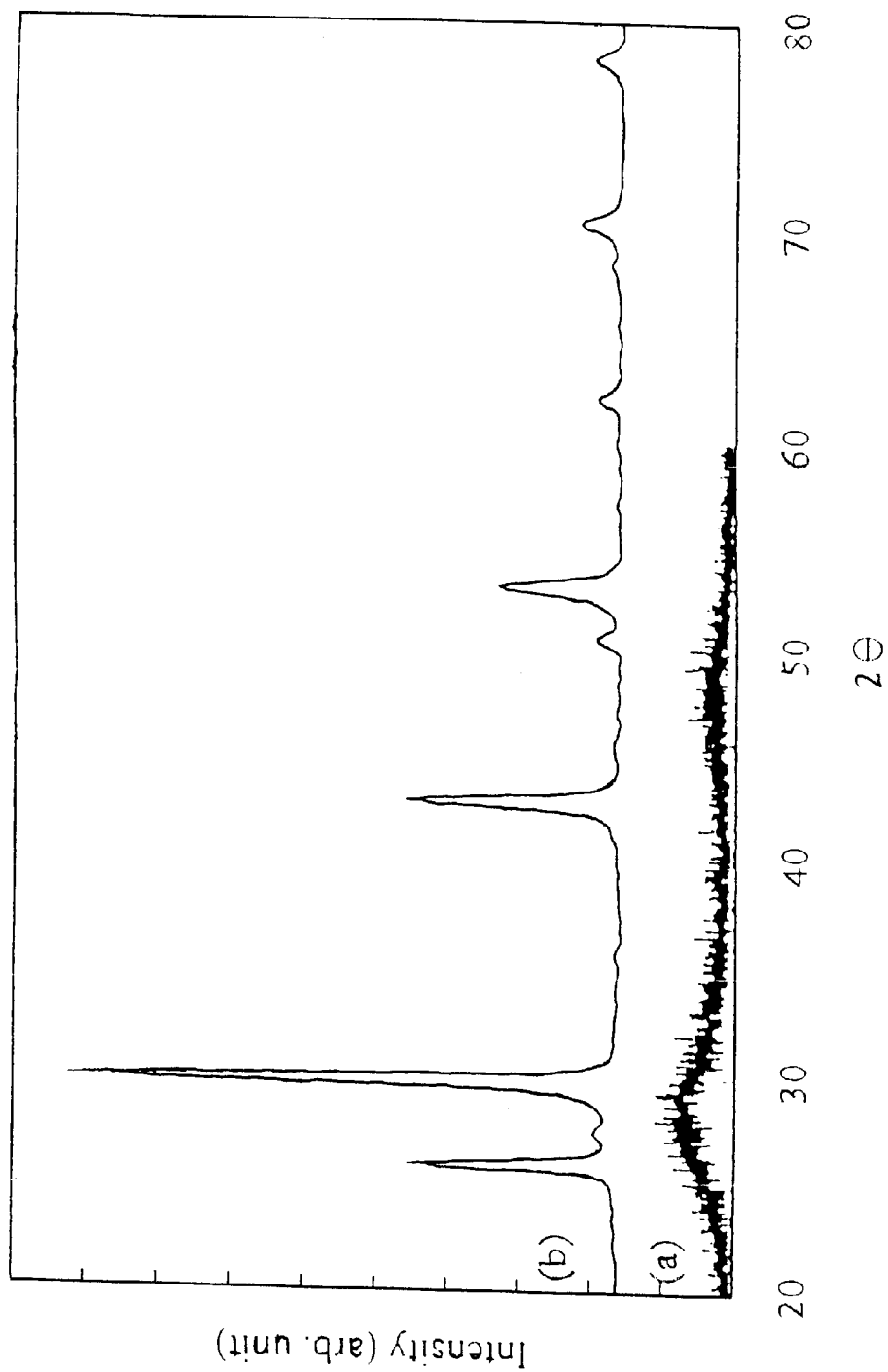
FIG. 2 shows the X-ray diffraction patterns of a first embodiment of the present invention.

Referring to FIG. 2, the X-ray diffraction patterns of the second group samples of $Te_{50.4}Ge_{40.0}Sb_{9.3}B_{0.3}$ (i.e. the first embodiment of the present invention) are shown. The X-ray diffraction pattern is used to understand the structure of the test group samples. Since the four groups have similar structures, only the X-ray diffraction pattern of the second group is shown. In FIG. 2, the curves (a) and (b) are the X-ray patterns of the second group samples at the as-prepared and as-annealed states respectively. The as-prepared state is identified as an amorphous state and the as-annealed state is as a identified crystalline state. The crystal structure for the entire four group crystallized samples is FCC, and the lattice parameter increases from 0.598 nm to 0.602 nm with the B content increasing.

Figure 3:
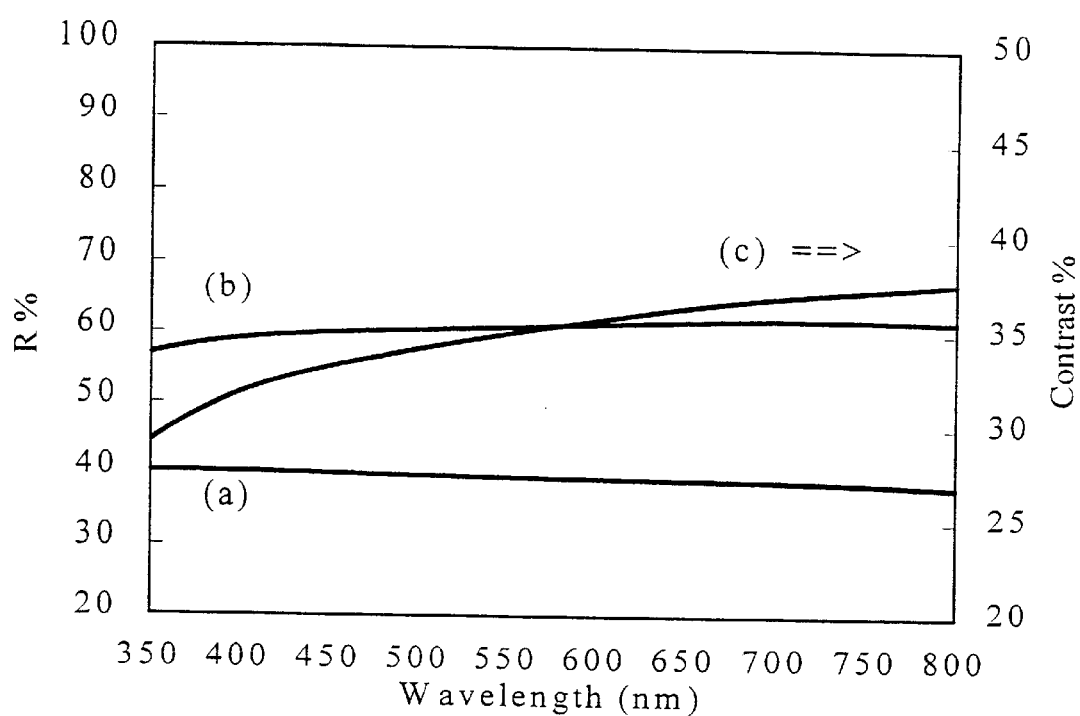
FIG. 3 shows the diagram of the reflectance and optical contrast of the present invention.

Referring to FIG. 3, the reflectance and optical contrast of the first group samples of $Te_{51.2}Ge_{39.5}Sb_{9.3}$ is shown. The curves (a) and (b) respectively show the reflectance Ra and Rc of the first group samples at their as-prepared and as-annealed states in the visible wavelength range of 350 nm to 800 nm measured by a spectrophotometer (Hitachi U3410). The reflectance Ra and Rc of the first group samples of $Te_{51.2}Ge_{39.5}Sb_{9.3}$ are of about 40% and 60% at their as-prepared and as-annealed states respectively. The curve (c) shows the calculated optical contrast of the first group samples of $Te_{51.2}Ge_{39.5}Sb_{9.3}$ between their two states. The optical contrast (denoted as C) is the ratio of the reflectance difference (Rc—Ra) between as-annealed state and as-prepared state to the as-annealed state reflectance. The optical contrast is a function of the exposured wavelengths and is represented as $$C=(Rc-Ra)/Rc=\Delta R/Rc.$$

According to the measured results of the reflectance Ra and Rc shown in FIG. 3, the optical contrast of the first group samples of $Te_{51.2}Ge_{39.5}SB_{9.3}$ composition is of about 30 to 37% and increases as the wavelength increases.

Figure 4:
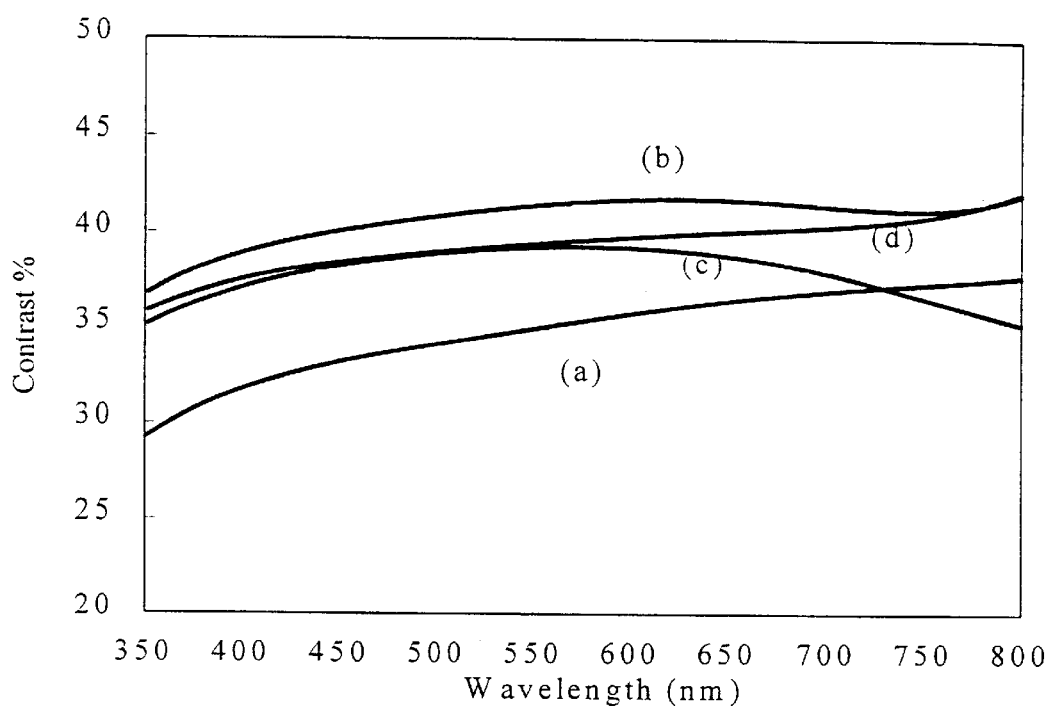
FIG. 4 shows a diagram of the optical contrast of all embodiments according to the present invention.

Referring to FIG. 4, in which the optical contrasts of the four group samples of $Te_{51.2}Ge_{39.5}Sb_{93}$, $Te_{50.4}Ge_{40.0}Sb_{9.3}B_{0.3}$, $Te_{50.6}Ge_{39.4}Sb_{9.3}B_{0.7}$ and $Te_{50.2}Ge_{39.2}Sb_{9.5}B_{1.1}$ compositions are shown. Curves (a), (b), (c) and (d) are their respective optical contrasts. It is obvious that the optical contrasts of the group samples with a Boron element at a weight percent of about 0.5 to 2.0 doping are 5% larger than that of the group samples without Boron element doping, and keep over 35% reflectance within the visible wavelength range of 350 nm to 800 nm.

The CNR of a rewritable optical disk with a recording layer made of the information recording medium having a Te—Ge—Sb—B quaternary alloy according to the present invention is expected to increase. And the information recording medium of the present invention is suitable for the optical disk performed in the shorter visible wavelength range to further increase recording density. In addition, since the information recording medium according to the present invention is a single-phase quaternary alloy, the performance of the repeated recording and erasing is expected to enhance.

It is noted that optical information recording media described above are the preferred embodiments of the present invention for the purposes of illustration only, and are not intended as a definition of the limits and scope of the invention disclosed. Any modifications and variations that may be apparent to a person skilled in the art are intended to be included within the scope of the present invention.

What is claimed is:

1. A rewritable optical information recording medium of the phase-change type, comprising:

a substrate;

a first dielectric layer formed on said substrate;

a recording layer formed on said first dielectric layer and made of a Te—Ge—Sb—B quaternary alloy, wherein said Te—Ge—Sb—B guaternary alloy is defined by a formula $Te_aGe_bSb_cB_d$, where a, b, c, and d are atomic percentages ranging from 45 to 57, 33 to 45, 5 to 15, and 0.1 to 2, respectively, such that said recording layer exhibits an optical contrast greater than 35% between an amorphous state and a crystalline state at a wavelength range between 350 nm and 800 nm;

a second dielectric layer formed on said recording layer;

a reflective layer formed on said second dielectric layer; and a protective layer formed on said reflective layer.

2. The rewritable optical information recording medium as claimed in claim 1 wherein said substrate is made of one of polymethyl methacrylate, polycarbonate and glass.

3. The rewritable optical information recording medium as claimed in claim 1 wherein said first dielectric layer and second dielectric layer comprise at least one compound selected from the group consisting of $SiO_2$, ZnS, $TaO_2$, GeO, AlN, and $Si_3N_4$.

4. The rewritable optical information recording medium as claimed in claim 1 wherein said reflective layer contains at least an metal element selected from the group consisting of Al, Ag, Au, Ni, Ti, Cr, Pt, and Pd.

5. The rewritable optical information recording medium as claimed in claim 1 wherein said protective layer is made of a resin or an UV curable plastic material.

6. The rewritable optical information recording medium as claimed in claim 1 wherein said recording layer at the crystalline state has a face-centered cubic structure.

7. The rewritable optical information recording medium as claimed in claim 1 wherein said recording layer has a thickness between 10 nm and 60 nm.

8. The rewritable optical information recording medium as claimed in claim 1 wherein said recording layer has a lattice parameter between 0.59 nm and 0.61 nm.

9. The rewritable optical information recording medium as claimed in claim 1 wherein said recording layer is formed by a vacuum evaporating method, a vacuum sputtering method or a vacuum ion-plating method.

10. A rewritable optical information recording alloy for forming a recording layer of a phase-change optical disk, having the composition defined a formula $Te_aGe_bSb_cB_d$ where a, b, c and d are atomic percentages ranging from 47 to 53, 38 to 43, 8 to 13 and 0.1 to 1.5 respectively, such that said alloy exhibits an optical contrast greater than 35% between an amorphous and a crystalline state at a wavelength range between 350 nm and 800 nm.

11. The rewritable optical information recording medium as claimed in claim 10 wherein said recording layer at the crystalline state has a face-centered cubic structure.

12. The rewritable optical information recording medium as claimed in claim 10 wherein said recording layer has a thickness between 10 nm and 60 mm.

13. The rewritable optical information recording medium as claimed in claim 10 wherein said recording layer has a lattice parameter between 0.59 nm and 0.61 nm.

14. The rewritable optical information recording medium as claimed in claim 10 wherein said recording layer is formed by a vacuum evaporating method, a vacuum sputtering method or a vacuum ion-plating method.

* * * * *